(12) United States Patent
Wilcoxon et al.

(10) Patent No.: US 11,178,861 B1
(45) Date of Patent: Nov. 23, 2021

(54) FISHING LINE RIGGING TOOL

(71) Applicants: John L. Wilcoxon, Nokesville, VA (US); Brandon K. Lattimer, Broken Arrow, OK (US)

(72) Inventors: John L. Wilcoxon, Nokesville, VA (US); Brandon K. Lattimer, Broken Arrow, OK (US)

( * ) Notice: Subject to any disclaimer, the term of this patent is extended or adjusted under 35 U.S.C. 154(b) by 741 days.

(21) Appl. No.: 15/615,430

(22) Filed: Jun. 6, 2017

(51) Int. Cl.
*A01K 97/00* (2006.01)
*A01K 87/04* (2006.01)
*A01K 87/00* (2006.01)
*A01K 91/03* (2006.01)

(52) U.S. Cl.
CPC .............. *A01K 97/00* (2013.01); *A01K 87/04* (2013.01); *A01K 87/00* (2013.01); *A01K 87/002* (2013.01); *A01K 91/03* (2013.01)

(58) Field of Classification Search
CPC .... A01K 87/00; A01K 87/002; A01K 87/005; A01K 97/00; A01K 99/00; A01K 91/06
USPC ..... 43/4, 18.1 R, 18.1 HR; 223/99; 112/222, 112/223, 224, 225
See application file for complete search history.

(56) References Cited

U.S. PATENT DOCUMENTS

| | | | | |
|---|---|---|---|---|
| 2,416,260 A | * | 2/1947 | Karle | A61B 17/04 606/148 |
| 3,404,707 A | * | 10/1968 | Feld | D03J 3/00 139/1 R |
| 4,102,478 A | * | 7/1978 | Samoilov | D05B 87/00 223/99 |
| 4,667,860 A | * | 5/1987 | Feuerman | D05B 87/00 223/102 |
| 5,832,938 A | * | 11/1998 | Ybarra | A45D 8/34 132/210 |
| 6,439,000 B1 | * | 8/2002 | Smark | D04D 1/04 223/99 |
| 6,691,450 B2 | * | 2/2004 | Glavinich | A01K 91/04 43/4.5 |
| 10,258,025 B2 | * | 4/2019 | Grant | A01K 91/06 |
| 2003/0074827 A1 | * | 4/2003 | Maguire | A01K 87/002 43/24 |
| 2017/0258064 A1 | * | 9/2017 | Grant | A01K 97/00 |
| 2017/0258065 A1 | * | 9/2017 | Grant | A01K 97/00 |
| 2018/0368379 A1 | * | 12/2018 | Aurich | A01K 87/04 |

FOREIGN PATENT DOCUMENTS

GB          2321066 A  *  7/1998  ............ A01K 97/00

* cited by examiner

*Primary Examiner* — Darren W Ark
(74) *Attorney, Agent, or Firm* — GableGotwals

(57) ABSTRACT

A tool for feeding a fishing line through the eyelets of a fishing rod has a loop of filament attached to an elongated guide and twisted across itself at a distal overlap to form a figure-eight with proximal and distal portions wider and narrower, respectively, than the eyelets. The wider portion facilitates insertion of a free end of the line into the loop. The loop is resiliently flexible so that the overlap separates and then recovers as the inserted line is passed transversely through the gap into the narrower portion of the figure-eight. The passed line is then transversely wedged in the narrower portion of the figure-eight. The loop is also resiliently flexible so that, as the guide leads the loop and the line through each eyelet, the wider portion of the loop compresses and then expands, inhibiting inadvertent withdrawal of the tool from an eyelet.

10 Claims, 3 Drawing Sheets

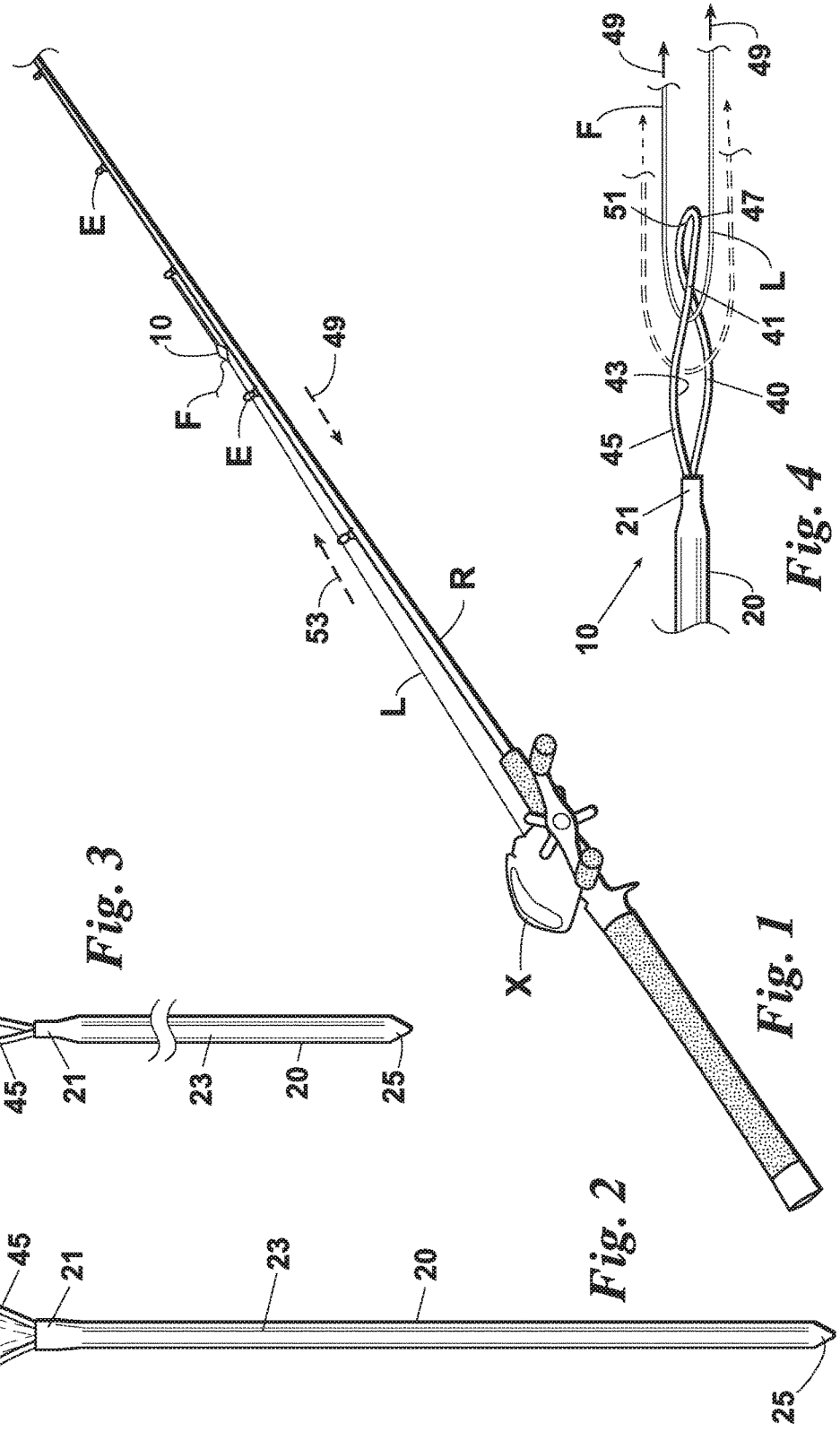

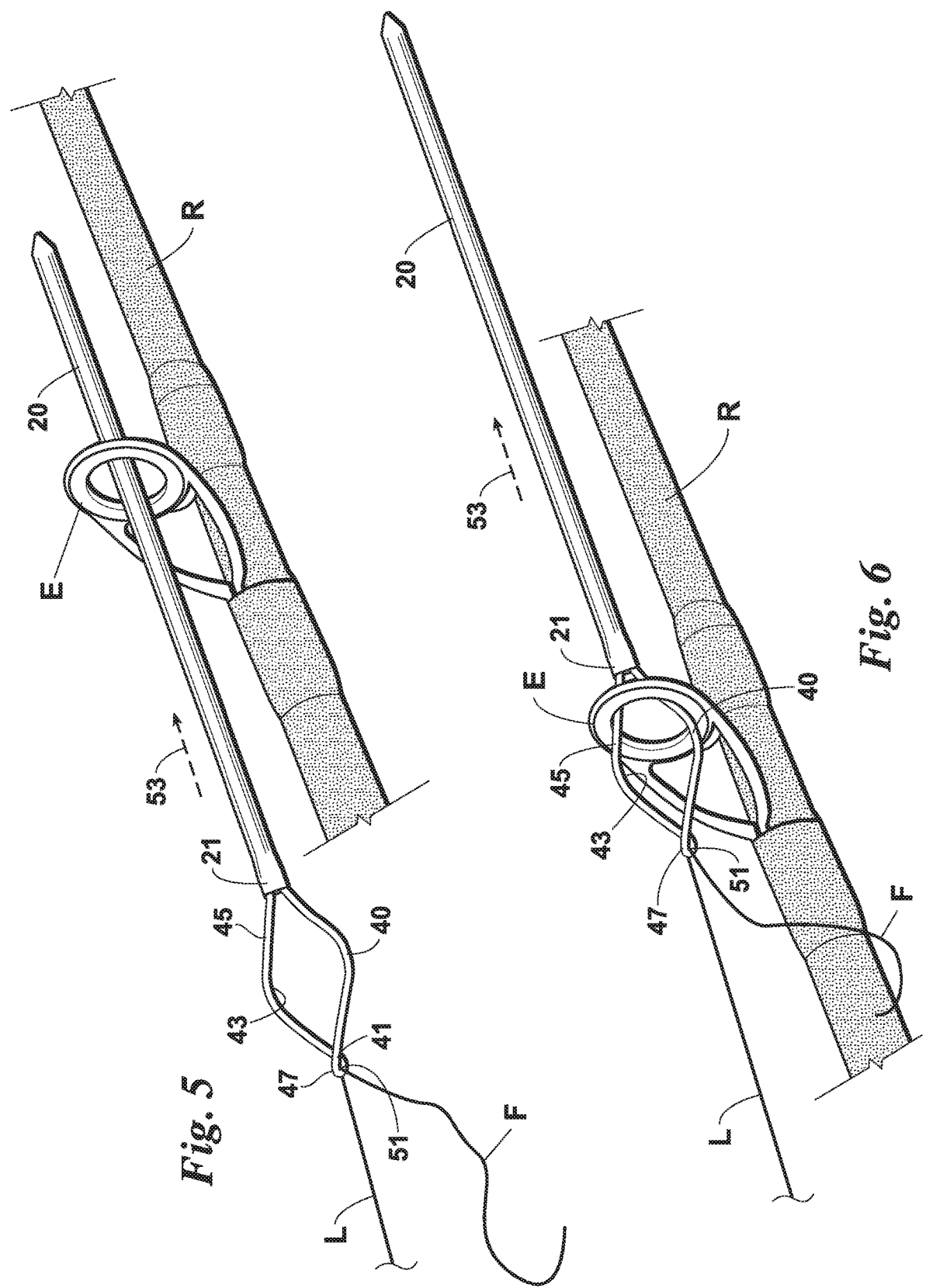

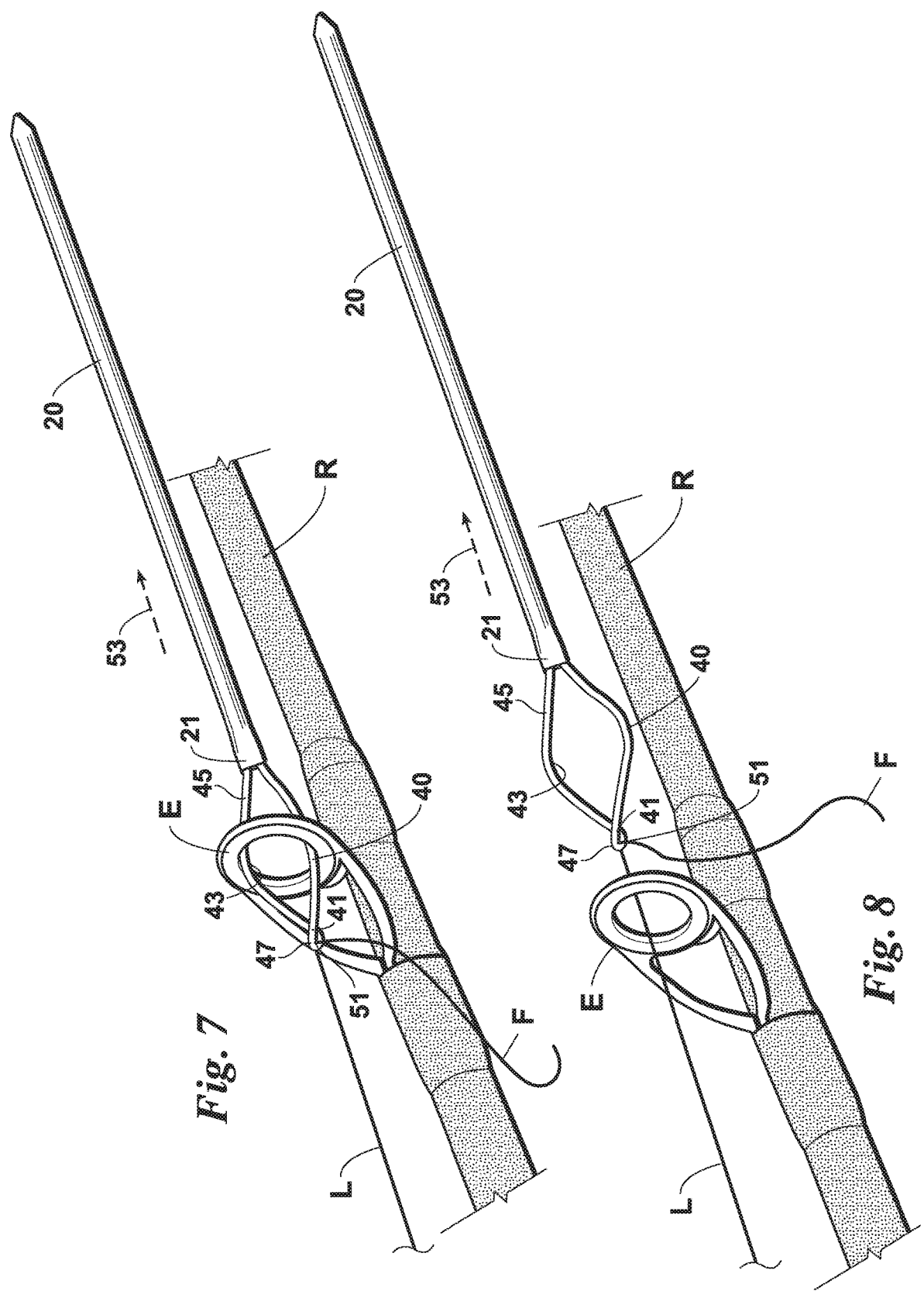

FISHING LINE RIGGING TOOL

BACKGROUND OF THE INVENTION

This invention relates generally to fishing tackle and more particularly concerns tools for rigging a fishing rod.

Fishing rod eyelets are relatively small and are usually sequentially smaller from reel to rod tip. Rigging a fishing line through the eyelets of a fishing rod, and sometimes multiple fishing rods, can be time-consuming, tedious and frustrating, especially if hand-eye coordination is hampered by physical, spacial, climatic or other limitations. For example, arthritis, less than twenty-twenty vision, tight or obstructed quarters on shore or in a boat and turbulent waters are just a few of the conditions which, alone or in concert, can make rigging increasingly difficult. Lost time re-rigging lines which have been damaged, broken or intentionally cut because of age, crimps, snags, tangles, propellers and the like can be particularly irritating if the fish are biting at an accelerated frequency for a likely short period of time.

It is, therefore, an object of this invention to provide a tool which facilitates feeding a fishing line through the eyelets of a fishing rod. Another object of this invention to provide a tool which is useful for rigging a fishing line in adverse conditions such as high winds and waves, and especially as might be encountered in salt water fishing. A further object of this invention to provide a tool which helps users with dexterity limitations to feed a fishing line through the eyelets of a fishing rod. Yet another object of this invention to provide a tool which helps users with vision impairments to feed a fishing line through the eyelets of a fishing rod.

It is also an object of this invention to provide a tool which helps users to feed a fishing line through the eyelets of a fishing rod in low light or nighttime conditions. Still another object of this invention to provide a tool which minimizes the possibility of a user losing control of or dropping a fishing line during rigging and having to start the rigging process anew, especially in heavy-line use as for fly fishing. And it is an object of this invention to provide a tool which is easily engaged and disengaged to and from a fishing line before and after feeding the line through the eyelets of the fishing rod.

SUMMARY OF THE INVENTION

A tool for feeding a fishing line through the eyelets of a fishing rod has an elongated guide contoured to pass through each of the eyelets with a loop of filament attached to a trailing end of the guide. The loop is twisted across itself at a distal overlap to form a figure-eight with a proximal portion wider and a distal portion narrower than each of the eyelets. The wider portion of the figure-eight permits insertion of a free end of the fishing line. The overlap permits the inserted line to be passed transversely from the wider into the narrower portion. The loop is resiliently flexible to cause the overlap to separate and recover in response to the line passing transversely therethrough and to cause the wider portion of the loop to compress and expand in response to the wider portion of the loop passing through an eyelet.

The guide may be a shaft and the shaft may be tapered. A trailing end of the guide may be tubular, in which case the tubular end may be crimped to grip proximal ends of the filament inserted into the tubular end.

The narrower portion of the figure-eight may have an acute distal end to facilitate transverse wedging of the line in the narrower portion. The wider portion may be ovoidal to facilitate compression and expansion during passage of the tool through an eyelet.

BRIEF DESCRIPTION OF THE DRAWINGS

Other objects and advantages of the invention will become apparent upon reading the following detailed description and upon reference to the drawings in which:

FIG. 1 is a perspective view of a tool in accordance with the invention being used to feed a fishing line from a fishing reel through the eyelets of a fishing rod;

FIG. 2 is a side elevation view of the tool of FIG. 1 with the invention in its normal configuration;

FIG. 3 is a side elevation view with parts broken away of the tool of FIG. 1 in a contracted configuration;

FIG. 4 is an exploded view of FIG. 3 with parts broken away illustrating the transition of a fishing line being loaded into the tool;

FIG. 5 is a perspective view of the tool of FIG. 1 in a first stage of passage through an eyelet of the fishing rod;

FIG. 6 is a perspective view of the tool of FIG. 1 in a second stage of passage through an eyelet of a fishing rod;

FIG. 7 is perspective view of the tool of FIG. 1 in a third stage of passage through an eyelet of the fishing rod; and FIG. 8 is a perspective view of the tool of FIG. 1 in a fourth stage of passage through an eyelet of the fishing rod.

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

Turning to FIG. 1, a tool 10 in accordance with the invention is useful for feeding a fishing line L through the eyelets E of a fishing rod R.

Looking at FIGS. 2-3, the tool 10 has an elongated guide 20 contoured to pass through each of the eyelets E. A loop of filament 40 is attached to a trailing end 21 of the guide 20. Comparing FIGS. 1 and 2, the loop 40 is twisted across itself at a distal overlap 41 to form an elongated figure-eight 43 with a proximal portion 45 wider and a distal portion 47 narrower than each of the eyelets E. However, comparing FIGS. 1 and 3, the width of the proximal portion 45 can be compressed to pass through the smallest eyelet E of the rod R. As seen in FIG. 3, in the compressed condition, the distal portion 47 is lengthened as the overlap 41 shifts in the proximal direction.

As seen in FIG. 4, the wider proximal portion 45 of the figure-eight 43 permits easier insertion of a free end F of the fishing line L into the loop 40 of the tool 10 than into the widest eyelet E of the fishing rod R. The filament crossing portions of the overlap 41 of the figure-eight 43 may abut or may be narrowly spaced to permit the line L inserted into the proximal portion 45 to be passed transversely in contact with the filament crossing portions from the proximal wider portion 45 into the distal narrower portion 47 of the figure-eight 43. As seen in FIG. 4, this can be accomplished by pulling simultaneously on both the fishing line L and the free end F of the line L in the distal direction 49 away from the guide 20. The loop 40 is resiliently flexible to permit the filament crossing sections to separate and recover in response to the fishing line L passing transversely therebetween and also to permit the proximal wider portion 45 of the figure-eight 43 to compress and expand in response to the proximal wider portion 45 of the figure-eight 43 passing through an eyelet E.

As best seen in FIGS. 2 and 3, the guide 20 may be a shaft 23 and the shaft 23 may have a tapered leading end 25. The tapered leading end 25 makes rigging easier and is also handy for untangling snarls apart from its rigging use. The trailing end 21 of the guide 20 may be tubular, as shown, and the tubular trailing end 21 may be crimped, as shown, to secure the proximal ends of the loop 40 in the tubular end 21 of the guide 20.

Looking at FIGS. 3 and 4, the distal narrower portion 47 of the figure-eight 43 is contoured to guide the fishing L to its distal apex. The narrower portion 47 may have an acute distal end 51 to facilitate transverse wedging of the line L in the distal narrower portion 47 as the line is pulled in the distal direction 49 during loading or as the tool 10 is pulled in the proximal direction 53 during rigging. The proximal wider portion 45 of the figure-eight 43 may be ovoidal to facilitate compression and expansion of the proximal wider portion 45 during passage of the tool 10 through an eyelet E.

Looking now at FIGS. 1 and 4-8, the operation of the tool 10 in rigging the rod R includes only a few simple steps. As seen in FIG. 4, loading the fishing line L in the tool 10 for rigging can be accomplished by inserting the leading end F of the line L into the wider portion 45 of the figure-eight 43 and then pulling the free end F and the line L simultaneously distally 49 in relation to the tool 10 until the line L passes between the crossing portions of the filament at the overlap 41 and into the narrower portion 47 of the figure-eight 43 to its distal apex. The line is secured by the contour and resilient flexibility of the narrower portion 47 of the figure-eight 43. Once loaded, the tool 10 can be fed through consecutive eyelets E of the rod R with the leading end of the guide 20 passing in the proximal direction through consecutive eyelets E, as seen in FIG. 1. If the reel X has a line guide assembly or a level wind guide, the loaded tool 10 can be passed through the line guide assembly or a level wind guide before being passed through the proximal eyelet E.

Turning to FIG. 5, in the first stage of feeding the tool 10 loaded with a line L through any eyelet E, the guide 20 is inserted and pushed or pulled in the proximal direction 53 through the eyelet E. Advancing to FIG. 6, in the second stage of feeding the tool 10 through the eyelet E, after the guide 20 has passed completely through the eyelet E and continues to travel in the proximal direction 53, the wider portion 45 of the figure-eight 43 strikes the inside walls of the narrower eyelet L. Moving on to FIG. 7, in the third stage of feeding the tool 10 through the eyelet E, the resilient flexibility of the filament allows the wider portion 45 of the figure-eight 43 to compress to the inner diameter of the eyelet E until the widest portion of the wider portion 45 has passed proximally 53 into the eyelet E. Looking finally at FIG. 8, in the fourth stage of feeding the tool 10 through the eyelet E, after the widest portion of the wider portion 45 has passed proximally 53 into the eyelet E, the resilient flexibility of the filament allows the wider portion 45 of the figure-eight 43 to expand to its widest width, whereupon it is again wider than the eyelet E. Once the wider portion 45 of the figure-eight 43 has passed through an eyelet E, if the tool 10 is dropped the expanded wider portion 45 of the figure-eight will resist the possibility of reversal of travel of the tool 10 through the rigged eyelet E. When the tool 10 has travelled sufficiently past the eyelet E, the free end F of the line L is, as shown, fully passed through the eyelet E.

The four stages are repeated for each sequential eyelet E until the rod R is fully rigged. When completed, the line L can be pulled until the free end F of the line L is fully withdrawn from the narrow portion 47 of the tool 10.

Thus, it is apparent that there has been provided, in accordance with the invention, a tool for feeding a fishing line through the eyelets of a fishing rod that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For feeding a fishing line through eyelets of a fishing rod, a tool comprising:
   an elongated guide contoured to pass through each of the eyelets; and
   a loop of filament attached to a trailing end of said guide and twisted across itself at a distal overlap to form a figure-eight having a proximal portion wider and a distal portion narrower than each of the eyelets, said wider portion of said figure-eight permitting a free end of the fishing line to be inserted therein and said overlap permitting the inserted line to be passed transversely from said wider into said narrower portion, said loop being resiliently flexible to cause said overlap to separate and recover in response to the line passing transversely therethrough and to cause said wider portion of said figure-eight to compress and expand in response to said wider portion of said figure-eight passing through an eyelet.

2. A tool according to claim 1, said guide being a shaft.

3. A tool according to claim 2, a leading end of said shaft being tapered.

4. A tool according to claim 1, at least a trailing end of said guide being tubular.

5. A tool according to claim 4, said tubular trailing end of said guide being crimped to grip proximal ends of said loop therein.

6. A tool according to claim 1, said wider portion of said loop being ovoidal.

7. A tool according to claim 6, said narrower portion of said loop being contoured to guide the fishing line to a distal apex of said narrower portion.

8. A tool according to claim 7, said narrower portion of said loop further having an acute distal end.

9. A tool according to claim 1, said narrower portion of said loop being contoured to guide the fishing line to a distal apex of said narrower portion.

10. A tool according to claim 9, said narrower portion of said loop further having an acute distal end.

* * * * *